United States Patent [19]

Vinokurov et al.

[11] 4,238,700

[45] Dec. 9, 1980

[54] ELECTRICAL MACHINE HAVING AN IMPROVED COOLING SYSTEM FOR A ROTARY SUPERCONDUCTIVE WINDING

[76] Inventors: Alexandr A. Vinokurov, ulitsa Polzunova, 31, kv. 314; Gennady S. Gorbunov, ulitsa Polzunova, 35, kv. 42; Anatoly G. Korolkov, ulitsa Ivanova, 5, kv. 71; Jury S. Popov, ulitsa Bariernaya, 16, kv. 14; Lev M. Rozenfeld, ulitsa Pravdy, 7a, kv. 30., all of Novosibirsk; Jury V. Skachkov, Nevsky prospekt, 125, kv. 13., Leningrad; Iosif F. Filippov, ulitsa Pulkovskogo, 17, kv. 39, Leningrad; Gary M. Khutoretsky, Altaiskaya ulitsa, 20, kv. 5, Leningrad, all of U.S.S.R.

[21] Appl. No.: 855,312

[22] Filed: Nov. 28, 1977

[51] Int. Cl.² ............................................. H02K 9/00
[52] U.S. Cl. ...................................... 310/52; 62/505; 165/89
[58] Field of Search .................... 310/10, 40, 52, 54, 310/64, 261; 335/126; 165/89, 90; 62/505, 514

[56] References Cited

U.S. PATENT DOCUMENTS

| | | | |
|---|---|---|---|
| 3,106,334 | 10/1963 | Fogleman | 62/505 |
| 3,679,920 | 7/1972 | MacNab | 310/52 |
| 3,745,389 | 7/1973 | Lorch | 310/52 |
| 3,781,578 | 12/1973 | Smith | 310/52 |
| 4,020,642 | 5/1977 | Haselden | 62/505 |

*Primary Examiner*—R. Skudy
*Attorney, Agent, or Firm*—Lackenbach, Lilling & Siegel

[57] ABSTRACT

A super-conductive, cryogenically-cooled electrical machine comprises a superconductive exciting winding located in a hollow rotor and a system for cooling the ends of the rotor shaft. The cooling agent is delivered from one end of said shaft to the rotor space through the axial passage of the shaft whose ends are made of at least two coaxial tubes secured together by threading. The cooling agent is removed through the clearances of said thread and such construction of the rotor shaft reduces heat influxes to the superconductive exciting winding at least threefold and lowers the weight-to-power ratio of the machine at least fivefold.

5 Claims, 2 Drawing Figures

ELECTRICAL MACHINE HAVING AN IMPROVED COOLING SYSTEM FOR A ROTARY SUPERCONDUCTIVE WINDING

BACKGROUND OF THE INVENTION

This invention relates to electrical machines and, in particular, to cryogenically-cooled machines.

The invention is employed in electrical machines, e.g. motors, generators, converters, which are used at nuclear, steam and other power stations, as well as in vehicle transport and in aviation. The invention is advantageous to use also in other installations, where the shaft is to emerge from a cool zone into the environment.

At present much consideration is given to development of electrical machines, wherein the superconductivity phenomenon is realized, when the resistance in electric circuits approaches to its zero value. There exist materials capable of realizing this phenomenon at a temperature close to the absolute zero. That is why a cryogenic liquid, e.g. liquid helium, is used in such machines to cool the electric windings to such a temperature where they become superconductive (usually this temperature is about 5° K).

Cryogenically-cooled electrical machines using a normal circuit comprise a superconductive winding secured in a rotor encased in a tight heat-insulating shell, with a protective vacuum being provided therein. The superconductive exciting winding has a cryogenic cooling system. The low-temperature zone of the superconductive exciting winding has to be heat-insulated from the ambient medium. Complete insulation of the machine drive system is impossible, because at least the drive end of the rotor shaft is to be extended outside. Usually, the shaft is solid, since it has to accept and to impart the torque. The shaft in this case brings in the main component of heat influx to the superconductive winding (up to 50 %). In this connection, there exists a problem of cooling the rotor shaft in order to build up such a thermal resistance between the winding and the rotor shaft as to limit the amount of heat propagating along the rotor axis to the winding.

There is known a cryogenically-cooled electrical machine in which in order to reduce the heat influx along the shaft to the superconductive winding of the rotor, a plurality of openings designed to remove the cooling agent from the rotor hollow space is made in places, where the central part of the rotor is attached to the shaft. The removed flow of the cooling agent works at the same time to cool the ends of the rotor shaft.

This design is deficient in that the efficiency of such cooling is low, since the heat removal area is small and cannot be expanded by mere increase of the number of openings due to the rotor shaft strength requirements.

There is also known a cryogenically-cooled electrical machine comprising a hollow rotor with a superconductive exciting winding, the supply bus conductors being coupled thereto. The cooling system comprising a passage for delivery of the cooling agent to the superconductive exciting winding, arranged along the axis of the rotor shaft, and a means for cooling the rotor shaft ends and passages for removing the cooling agent from the superconductive winding.

The means for cooling the rotor shaft ends comprise heat-insulating plugs installed in the central part of the hollow rotor, where it is joined to the rotor shaft. The fitted surfaces of the heat-insulating plugs and of the central part of the rotor are provided with helically arranged ribs.

The low-temperature gas or liquid (cooling agent) is supplied to the superconductive exciting winding through the passage made along the axis of the rotor shaft, from one end of said shaft.

The heat coming to the rotor hollow vaporizes the cooling agent, and the resulting vapors pass into the clearances between the internal surface of the rotor central part and the external surface of the heat-insulating plugs. The cold gas passes along the clearances between the ribs towards the cooling agent removal passages and takes away the heat penetrating from outside from the shaft butt ends.

In this machine, cooling of the rotor shaft ends is, however, ineffective, since a considerable amount of heat is transmitted to the rotor hollow in places, where the shaft ends are secured to the central part of the rotor and where no protection against the outside heat influx can be provided.

The additional means for cooling the ends of the rotor shaft, that is the heat-insulating plugs, makes the electrical machine design more complicated and larger.

Besides, such a design is deficient in that the gas which is heated when passing through the clearances between the ribs and through the passages for removal of the cooling agent is thrown inside the electrical machine, since it has no means for collecting the used cooling agent.

It should be also pointed out that the machine has no protection against heat influx along the supply bus conductors.

SUMMARY OF THE INVENTION

It is an object of the invention to reduce heat influxes to the superconductive exciting winding of an electrical machine by at least three times as compared with the existing designs.

This object is achieved by a cryogenically-cooled electrical machine comprising a superconductive exciting winding to which supply bus conductors are connected and which is located inside a hollow rotor whose shaft is provided with an axial passage for delivering the cooling agent to the superconductive exciting winding. The ends of the rotor shaft are made of at least two coaxial tubes secured together by means of a thread whose clearances are intended for removal of the cooling agent and cooling the ends of the rotor shaft.

In order to cool both ends of the shaft and to remove the used cooling agent thereby, the thread of said ends is made in the opposite directions.

In order to increase the heat removal by means of quicker gas movement, the direction of the thread whose clearances are used to remove the cooling agent should coincide with the direction of the moving gas.

In order to increase the cooling efficiency by elimination of heat inflow through the supply bus conductors, it is desirable that the latter be placed in slots made in the thread profile.

It is expeditious that the coaxial tubes of the shaft ends be joined by means of a multiple-start thread, which expands the heat-exchange surfaces both of the shaft ends and of the supply bus conductors located in the profile of said thread.

Such novel and unique design of the cryogenically-cooled electrical machine permits cooling of the shaft ends throughout their length and cross-section, and a considerable three or fourfold reduction of the heat influx via the rotor shaft into the rotor hollow is achieved as compared to the known machines.

An important advantage of such design of the rotor shaft of the electrical machine consists in the simple construction of the machine itself, small dimensions, higher reliability and, consequently, about a fivefold reduction of the weight of the machine as a whole with respect to its power, which is an important consideration for power equipment.

BRIEF DESCRIPTION OF THE DRAWINGS

Other objects and advantages of the present invention will become apparent from the following detailed description of preferred embodiments thereof, taken in conjunction with the accompanying drawings, wherein.

DESCRIPTION OF THE PREFERRED EMBODIMENTS

Figure 1:
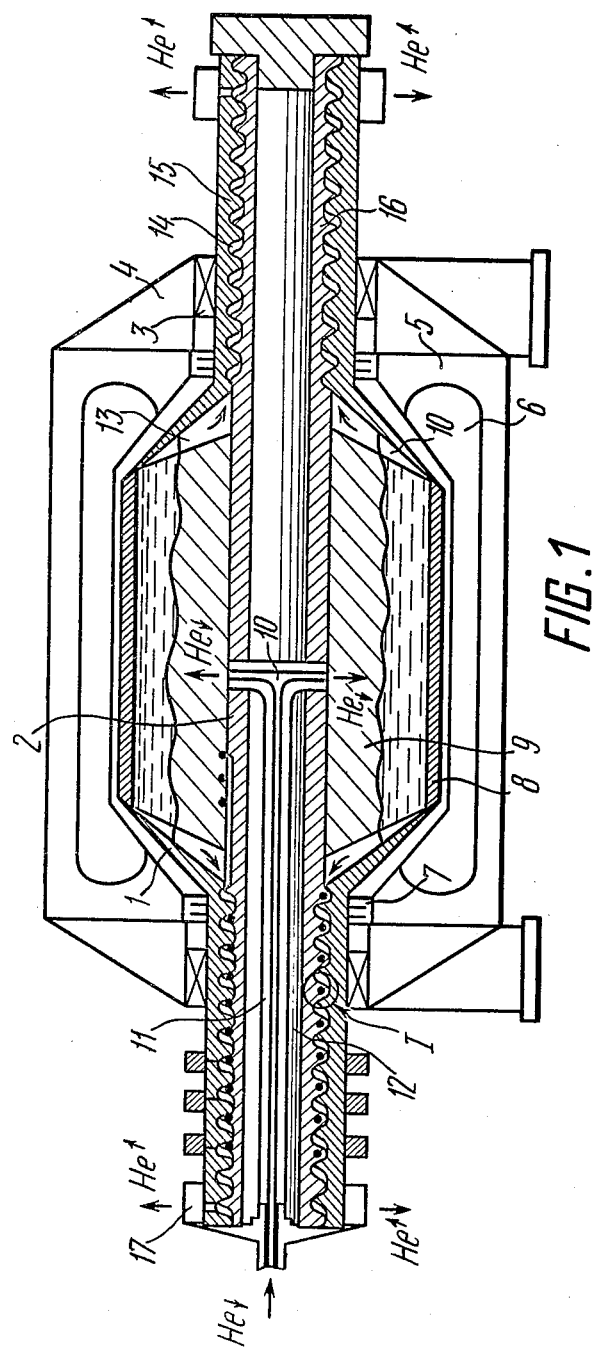
FIG. 1 is a longitudinal sectional view of a cryogenically-cooled electrical machine, according to the invention.

A cryogenically-cooled electrical machine comprises a hollow rotor 1 whose shaft 2 rests upon the bearings 3 located in butt shields 4 of the tight shell 5, a stator winding 6 being secured on the internal surface thereof. Vacuum is maintained within the space between the rotor 1 and the shell 5 in order to ensure heat insulation of the rotor 1. Rotating vacuum seals 7 are placed in the butt shields 4 to maintain said vacuum.

The hollow rotor 1 is composed of a non-magnetic cylinder 8, an exciting winding being secured inside said cylinder 8 by means of an epoxy compound. The exciting winding 9 is made of a superconductive material, e.g. $Nb_3Sn$(niobium tin). It can be also made of other materials possessing good conductivity, such as zirconium niobium and titanium niobium.

The exciting winding 9 is cooled to a superconducting state by means of a cooling agent 10 filling the space of the non-magnetic cylinder 8. The cooling agent can be liquid hydrogen or helium, both liquid or gaseous. The cooling agent 10 is supplied to the exciting winding 9 via the vacuum-insulated pipe 11 which extends along an axial passage 12 of the shaft 2 from one end of said shaft 2. Two chambers 13 formed by the butt walls of the non-magnetic cylinder 8 and of the exciting winding 9 are provided in the rotor 1 to remove the cooling agent 10 from the exciting winding 9. The ends of the shaft 2 of the rotor 1 are made as two coaxial tubes 15 and 16 secured together by means of a thread, whose clearances are passages 14 for removing the cooling agent 10, which communicate with the chambers 13.

The thread can be made throughout the length of the tube connection or in some parts of this connection depending on the imparted torque and the amount of heat inflowing via the shaft to the exciting winding 9.

Besides, the number of such coaxial tubes secured together by the thread can be more than two. The thread is preferably made as a multiple-start thread, which permits an increase of the heat removal surface, reduction of resistance to the cooling agent passage and also permits or provides a specific temperature gradient along the shaft length.

Figure 2:
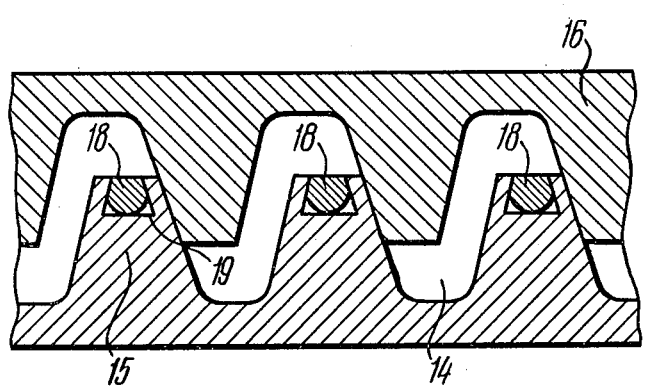
FIG. 2 shows a typical sectional view of the profile of the thread of the electrical machine rotor provided with supply bus conductors, according to the invention.

The thread should have a specific clearance, e.g. an incomplete trapezoidal thread, in order to ensure the required gas passage (as best shown in FIG. 2).

In order to cool both ends of the shaft 2 of the rotor 1, the thread on the ends of the shaft 2 has opposite directions, which are selected depending on the gas flow direction: the cooling agent flow direction should coincide with the thread direction. The passages 14 are associated with a gas collector 17.

Supply bus conductors (or current leads) 18 (FIG. 2) made of copper and connected to the superconductive exciting winding 9 by a common method serve to feed the exciting winding 9. The current leads 18 are to be cooled with a gaseous cooling agent 10 flowing from the superconductive exciting winding 9, because the leads 18, like the shaft 2, are good conductors of heat transferred to the superconductive exciting winding 9 from the environment; moreover, they themselves generate heat.

In order to eliminate heat influxes, the conductors are located in the passages 14 for removal of the cooling agent 10. For this purpose slots 19 are made in the thread profile and the supply bus conductors 18 are arranged therein. They can be located in the thread profile of both the external tube 15 and the internal tube 16.

Liquid helium used as the cooling agent 10 is supplied to the superconductive winding 9 through the pipeline 11. The heat penetrating into the hollow of the rotor 1 vaporizes helium. The helium vapours pass into the chambers 13 and are removed thereafter from the hollow of the rotor 1 through the passages 14 for removal of the cooling agent 10. At the same time both ends of the shaft 2 of the rotor 1 and the supply bus conductors 18 located in the slots 19 are cooled by the vapours escaping to the gas collectors 17.

The direction of the cooling agent 10 is shown in FIG. 1 by the reference arrows.

What is claimed is:

1. A cryogenically-cooled machine comprising:
    a shell;
    a stator winding secured in said shell;
    a hollow rotor located in said stator winding and having a shaft;
    a superconductive exciting winding located in said hollow rotor;
    supply bus conductors coupled to said superconductive exciting winding;
    a passage for delivery of a cooling agent to said exciting winding, provided in one end of said shaft and arranged along the axis of said shaft;
    said shaft having ends comprising at least two coaxial tubes connected by means of a thread; and
    said thread having clearances for removing the cooling agent and cooling the ends of said shaft.

2. An electrical machine as claimed in claim 1, in which said thread on different ends of said shaft has opposite directions.

3. An electrical machine as claimed in claim 2, in which the direction said thread coincides with the direction of flow of the cooling agent.

4. An electrical machine as claimed in claim 1, comprising slots in the profile of said thread for said supply bus conductors.

5. An electrical machine as claimed in claim 4, in which said thread is a multiple-start type of thread.

* * * * *